United States Patent

[11] 3,623,140

| [72] | Inventor | Sarkis Nercessian<br>Long Island City, N.Y. |
|---|---|---|
| [21] | Appl. No. | 7,174 |
| [22] | Filed | Jan. 30, 1970 |
| [45] | Patented | Nov. 23, 1971 |
| [73] | Assignee | Forbro Design Corp.<br>New York, N.Y. |

[54] PLURALITY OF PROGRAMMABLE REGULATED POWER SUPPLIES SHARE THE LOAD IN A PREDETERMINED RATIO WITH OVERALL STABILITY DETERMINED BY THE MASTER SUPPLY
10 Claims, 4 Drawing Figs.

[52] U.S. Cl. ................................................ 323/23,
323/40, 330/100
[51] Int. Cl. ...................................................... G05f 1/56
[50] Field of Search ........................................... 330/98,
100, 103; 323/16, 19, 22 Z, 22 T, 23, 38, 40

[56] References Cited
UNITED STATES PATENTS

| 3,133,242 | 5/1964 | Harries | 323/22 Z |
| 3,303,412 | 2/1967 | Gately | 323/22 T X |
| 3,411,014 | 11/1968 | Kupferberg | 323/22 T X |
| 3,470,457 | 9/1969 | Howlett | 323/22 T |

*Primary Examiner*—A. D. Pellinen
*Attorney*—Alfred W. Barber

ABSTRACT: A plurality of programmable power supplies are connected in cascade and are interconnected in such manner as to provide that they share the load in predetermined ratios and so that the overall stability is determined substantially solely by the characteristics of the master supply.

Prior art combinations of power supplies have been of two general kinds. The first kind has been called "piggy-back" where an unregulated power supply is connected in series with a programmable regulated power supply. An overall feedback circuit has been used to control the voltage across the load. Such an arrangement, however, cannot provide output voltage less than the output of the unregulated power supply and voltage ratio load sharing cannot be provided. The second kind uses two programmable regulated power supplies in a master-slave combination. The master power supply is used to control the slave power supply. There is no overall feedback and hence, the accuracy and stability of the system is governed by the less stable and accurate of the two power supplies. Offset and drift, for example, may be degraded by the slave power supply.

INVENTOR.
SARKIS NERCESSIAN
BY
*Alfred W. Barber*
ATTORNEY

PLURALITY OF PROGRAMMABLE REGULATED POWER SUPPLIES SHARE THE LOAD IN A PREDETERMINED RATIO WITH OVERALL STABILITY DETERMINED BY THE MASTER SUPPLY

SUMMARY

A programmable regulated power supply is a power supply, the output voltage of which may be determined by means of a resistor, voltage or current. In order to provide more power to a load than one power supply can provide, two or more power supplies may be connected together. One way in which power supplies may be combined is termed "master-slave" in which one power supply is programmed and one or more additional power supplies are controlled from the programmed supply. The programmed supply is termed the "master" while the controlled supply or supplies are termed "slaves". A number of possible combinations of "master-slave" power supplies are shown and described in U.S. Pat. No. 3,275,927.

The master-slave power supply combinations of the prior art generally suffer from limitations imposed by the "slave" power supply. The overall stability, offset and accuracy of the combination is determined by the characteristics of the slave supply in addition to those of the master.

The present invention provides a master-slave power supply combination in which the overall stability, offset and accuracy is determined solely by the characteristics of the master supply. These results are accomplished by a feedback circuit connected from the load to the inverting input of the master supply. In addition, the new circuit provides for sharing the load between two or more power supplies in a predetermined manner. For example, two power supplies may be connected to share the load equally or in any other predetermined ratio. Three or more power supplies may be connected to share in any predetermined ratio. The overall characteristics of the multiple power supplies are determined by the characteristics of the master supply regardless of the ratios of sharing.

An additional feature of the present invention is that two or more power supplies of different output polarity (with respect to the common line) may be combined to share the load. Thus, a positive output power supply may be combined with a negative output power supply with all of the advantages provided by the basic master-slave and load sharing characteristics provided by the combinations of the present invention.

Figure 1:
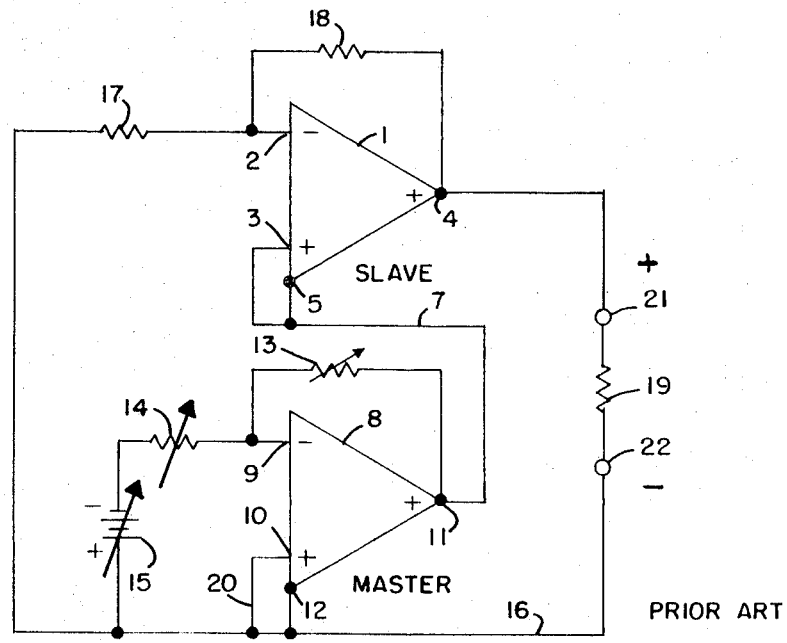
FIG. 1 is a partly schematic, partly block diagram of the prior art master-slave power supply combination.

FIG. 1 shows the prior art master-slave supply combination. The power supplies are represented by the familiar triangular amplifier symbol which will be understood to represent complete programmable power supplies including an inverting input terminal for the programming input, a noninverting input terminal which (since it is connected to common or ground in the combinations of the present invention) is not used, and an output terminal. Thus, a unipolar power supply may be used. The master power supply 8 includes an inverting input terminal 9, a noninverting input terminal 10, a common or ground terminal 12, which being connected by lead 20 to noninverting input terminal 10 may be one and the same, and output terminal 11. The slave power supply 1 includes inverting input terminal 2, a noninverting input terminal 3 likewise connected or identical with common or ground terminal 5, and output terminal 4. The polarity signs on the input and output terminals of both the master and slave supplies are to show the relative polarities and may all be reversed without affecting the operation of the system.

The master and slave power supplies are interconnected so that the master supply 8 controls the slave supply 1 and they combine outputs. Slave supply 1 is operated at a voltage gain between input 2 and output 4 determined by resistor 18 connected from output 4 to input 2 and resistor 17 connected from input 2 to common lead 16. Master supply 8 is operated at a voltage gain between input 9 and output 11 determined by resistor 13 connected from output 11 to input 9 and resistor 14 connected from input 9 to one side of programming voltage source 15, the other side of which is returned to common lead 16. The ratio of the resistance value of resistor 18 to that of resistor 17 is the value of the gain of slave supply 1 and the ratio of the resistance value of resistor 13 to that of 14 is the value of the gain of master supply 8.

A load to be supplied with power is connected between load terminals 21 and 22. Terminal 22 is connected to common lead 16. Terminal 21 is connected to slave supply output terminal 4. Common terminal 12 is connected to common lead 16 and output 11 is connected to common terminal 5. Thus, the voltage across load terminals 21-22 and hence across load 19 is the sum of the outputs of master supply 8 and slave supply 1. The output of master supply 8 is applied to the input of slave supply 1 since input 2 is returned through resistor 17 to common terminal 12 and output terminal 11 is connected to common terminal 5. The output of master supply 8 is programmed by the voltage of voltage source 15 multiplied by the ratio of the resistances of resistors 13 and 14. The output of master supply 8 may be varied in any well-known manner as by varying the resistance of resistors 13 or 14 or the voltage of voltage source 15 or a combination of all three.

Thus, the output across terminals 21-22 and load 19 is equal to the output voltage of the master supply 8 (which is voltage 15 times the gain of master supply 8) plus the output of master supply 8, times the gain of slave supply 1. The problem, solved by the present invention, arises from the fact that the regulation and stability of the final output voltage depends proportionally on the regulation and stability of the master and slave power supplies taken individually. In other words the master supply may possess a high degree of regulation and stability and yet the final output may be degraded by inferior regulation and stability of the slave supply. This is because the two outputs are simply added and there is no overall feedback, each supply being controlled by its own feedback circuit.

Figure 2:
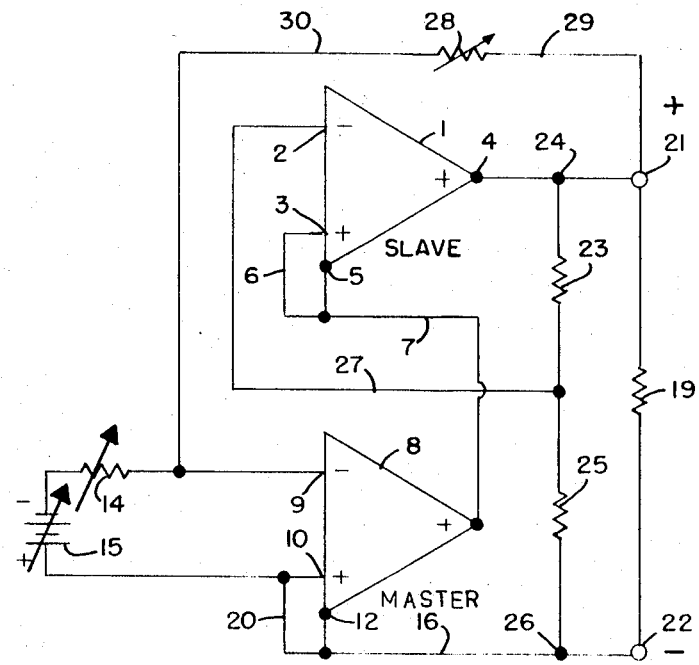
FIG. 2 is a partly schematic, partly block diagram of one form of the present invention.

FIG. 2 shows one form of the present invention in which master and slave programmable power supplies can be combined so that they not only share the load in a predetermined manner but also so that the final output voltage has regulation and stability characteristics dictated by the master supply independent of the regulation and stability characteristics of the slave supply. To show the invention the same designating numbers have been used for the master and slave as were used in FIG. 1 described in detail above.

The significantly different connections include the replacement of feedback resistor 13 of FIG. 1 by variable resistor 28 connected over lead 30 to inverting input 9 of master supply 8 and over lead 29 to load terminal 21 (also connected to slave power supply output terminal 4). The other significant circuit change is in the omission of slave power supply feedback resistor 18 and the connection of slave supply inverting input 2 over lead 27 to the junction between resistors 23 and 25 connected between terminals 24 and 26 which in turn are connected to load terminals 21 and 22 respectively.

In operation, the slave supply operates as a voltage follower since a programming voltage supplied by the voltage drop across resistor 23 is connected between output terminal 4 and inverting input terminal 2. The total output across output terminals 21 and 22 will be equal to the voltage of reference voltage 15 multiplied by the resistance of resistor 28 divided by the resistance of resistor 14. Thus, the two power supplies share output voltage in the ratio of the resistances of resistors 23 and 25. For example, if the resistance of resistor 23 is five times the resistance of resistor 25, the output of slave supply 1 will be five times the output of master supply 8 for all programmed values of total output voltage between terminals 21 and 22. This ratio of sharing of the output voltage can be set to the desired ratio by proper choice of resistors 23 and 25. Since the feedback is connected across the entire output (resistor 28) the overall regulation of the combined supplies will be determined by the regulating characteristics of master supply 8. Thus, a low cost supply with inferior regulating characteristics can be used for the slave supply 1 while maintaining high regulation and stability characteristics by using a high stability master supply 8.

The circuit of FIG. 2 is adapted for use with supplies of the same polarity either positive output with respect to common terminal or negative output with respect to common terminal. The meaning of positive output and negative output will be apparent from FIG. 3 where the internal amplifier and pass transistor are shown.

Figure 3:
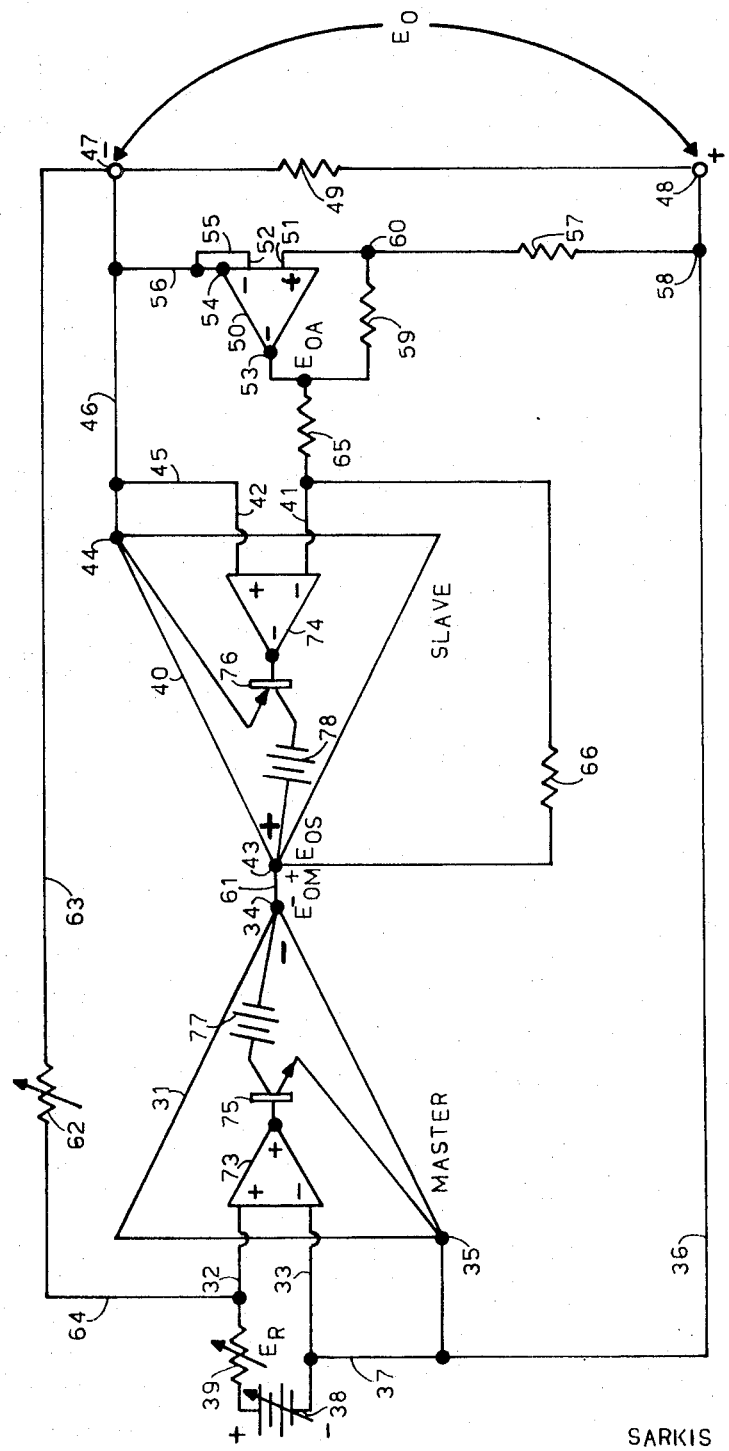
FIG. 3 is a partly schematic, partly block diagram of another form of the present invention.

FIG. 3 is a circuit in which positive and negative output supplies are combined. The particular circuit shown combines a negative output master supply with a positive output slave supply. The opposite polarities may obviously be combined in the same manner simply by reversing all polarities.

FIG. 3 shows a master supply 31, a slave supply 40 and an inverting amplifier 50. The symbols used for 31 and 40 are amplifier symbols intended to represent complete power supplies including internal amplifiers 73 and 74, pass transistors 75 and 76 and unregulated voltage sources 77 and 78 respectively. Master supply 31 includes an inverting input 32, a noninverting input 33, an output 34 and a common terminal 35. The final output of the system is provided across terminals 47 and 48. Noninverting input 33 is connected to common terminal 35 over lead 37. Common terminal 35 is also connected over lead 36 to load or final output terminal 48. Noninverting input 33 is connected to one side of input voltage source 38. Inverting input 32 is connected through input resistor 39 to the other side of input voltage source 38, and to first output terminal 47 over lead 64, through voltage control resistor 62 and over lead 63. Load 49 is connected between output terminals 47 and 48. Slave supply 40 includes an inverting input 41, a noninverting input 42, a common terminal 44 and an output terminal 43. Noninverting input 42 is connected over lead 45 to common terminal 44. Output terminal 34 of master supply 31 is connected over lead 61 to output terminal 43 of slave supply 40 and common terminal 44 of slave supply 40 is connected over lead 46 to load terminal 47. Feedback resistor 66 is connected from inverting input 41 to output 43. Inverting amplifier 50 includes inverting input 51, noninverting input 52, common terminal 54 and output 53. Noninverting input 52 is connected to common terminal 54 over lead 55. Common terminal 54 is connected to load terminal 47 over lead 56. Output 53 of inverting amplifier 50 is connected to inverting input 41 of slave supply 40 through input resistor 65. Feedback resistor 59 is connected between inverting input 51 and output 53. Input resistor 57 is connected between junction points 58 and 60 i.e., between load terminal 48 and inverting input 51. Slave supply 40 and master supply 31 are of opposite polarity, that is, they are adapted to supply output voltages of opposite polarities with respect to their common terminals (35, 44). Amplifier 50 inverts the polarity of positive output terminal 48 and its inverted output provides an input of negative polarity to slave supply 40.

The fact that the two power supplies are in series with each other can be seen by tracing the circuit starting with negative load terminal 47. The current returning from the load at terminal 47 flows along lead 46 to common terminal 44 of slave power supply 40 and internally through this power supply to its positive output terminal 43. From terminal 43 the current flows over connecting lead 61 to negative output terminal 34 of the master power supply 31. Now, since common terminal 35 is positive with respect to output terminal 34, the current flows internally through master power supply 31 to common terminal 35. Thus, common terminal 35 has the highest positive potential in the circuit and has a potential with respect to terminal 47 which is the sum of the voltages of power supplies 40 and 31. To complete the circuit, current flows over lead 36 to positive load terminal 48, down through the load back to the starting point at terminal 47.

In accordance with operational power supply or amplifier theory and operation, the following conditions are met by the operational power supplies and inverting amplifier as described above.

The output voltage between output terminals 47 and 48 and across load 49 is
$$E_O = E_R R_{62}/R_{39}.$$
The output of amplifier 50
$$E_{OA} = E_O R_{59}/R_{57}.$$
The output of slave supply 40
$$E_{OS} = E_{OA} R_{66}/R_{65}.$$
The output of master supply 31
$$E_{OM} = E_O - E_{OS}.$$

Making use of these relationships the desired ratio of sharing between the master and slave supplies can be determined. The inverting provided by amplifier 50 makes it possible to use master and slave supplies of opposite output polarities. This circuit also provides the combination of two fully programmable supplies, i.e., supplies programmable from full rated output voltage to zero, with feedback from the total output to the master supply and means for determining the ratio of output voltage sharing between the master and slave supplies, also over the full program range.

Figure 4:
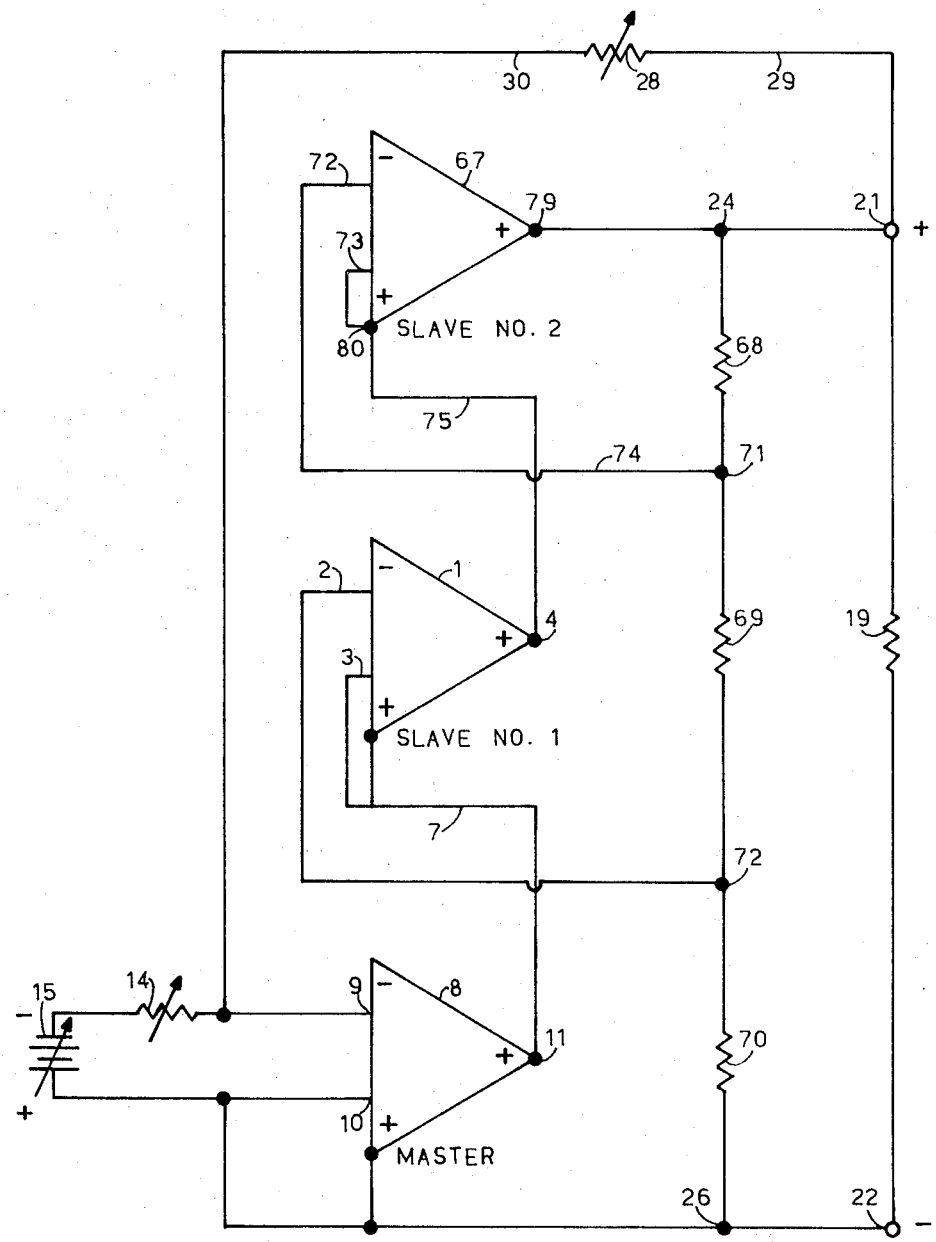
FIG. 4 is a partly schematic, partly block diagram of the present invention extended to two slave power supplies programmed by one master.

One mode of operation is obtained by making resistors 59 and 65 equal in which case
$$E_{OS} = E_O R_{66}/R_{57} = E_{OA} R_{66}/R_{59}$$
so that the ratio of sharing is determined by the ratio of resistors 66 and 57 and the gain of the slave supply is the ratio of resistors 66 and 59. This permits operating the amplifier 50 at a smaller output than the slave supply where the amplifier output is limited to a value less than the maximum desired output from the slave supply. If this limitation is not a consideration, the slave supply can be operated at unity gain by making resistors 65 and 66 equal in which case $E_{OS} = E_O R_{59}/R_{57} = E_{OA}$. FIG. 4 shows how a plurality of slave programmable power supplies can be programmed from a single master supply to share the load in predetermined ratios. One way in which this may be done with power supplies of the same output polarities is shown here and is similar to the arrangement shown in FIG. 2 but with a second slave supply 67 cascaded with the first slave supply 1. The second slave supply 67 includes inverting input 72, noninverting input 73, common terminal 80 and output 79. Noninverting input 73 is connected to common terminal 80. The first slave supply 1 is cascaded with the second slave supply 67 by connecting output 4 to input 73 (common terminal 80) over lead 75. Inverting input 72 is connected to junction 71 on the voltage divider made up of resistors 68, 69 and 70 over lead 74. If resistors 68, 69 and 70 are of equal value, the load is shared equally by the three power supplies.

The portion of the output voltage supplied by the power supplies are proportional to the resistors associated with each power supply input on the voltage divider. Thus, the master supply provides a portion of the output equal to the ratio of resistor 70 to the total resistance of the divider, i.e., resistors 68, 69 and 70 in series; the first slave supply 1 provides a portion of the output equal to the ratio of resistor 69 to the total resistance of the divider and the second slave supply 67 provides a portion of the output equal to the ratio of resistor 68 to the total resistance of the divider.

To summarize, a method of and means for combining a plurality of voltage programmable power supplies has been shown and described in detail above wherein superior overall results are obtained. First, the combination of master and slave power supplies may be programmed over the full range from the maximum output voltage equal to the sum of the rated maximum output voltages of the two power supplies down to zero output at which point both power supplies attain zero. Second, while each of the power supplies connected in master-slave relationship supplies equal current to the load, the voltage division ratio at any output voltage may be predetermined, for example, the slave power supply may supply nine-tenths of the output voltage and, thus, nine-tenths of the output power, while the master power supply may supply one-tenth of the output voltage and one-tenth of the output power. Third, the overall regulation and stability of the combination is that of the master power supply only and is not substantially affected by inferior regulation and stability characteristics of the slave power supply or supplies. This latter characteristic leads to economic combinations where a high-power power supply of relatively low cost per watt output is controlled by a relatively high cost per watt power supply but of much lower power capability to provide a resultant which has superior overall characteristics at a substantial saving in cost. Fourth, it has been shown that either power supplies of the same output polarity or of different output polarities may be combined to achieve the desired combination and function of sharing.

I claim:

1. In a master-slave regulated power supply system, the combination of;
    a first (master) programmable regulated power supply including a programming signal input terminal;
    a second (slave) programmable regulated power supply including a programming signal input terminal;
    a pair of load terminals;
    circuit means connecting said regulated power supplies in series aiding mode across said load terminals wherein one of said load terminals is of opposite polarity to said input terminal of said first supply;
    a source of programming signal connected to said signal input terminal of said first power supply:
    degenerative feedback resistor means connected from said opposite polarity load terminal to said signal input terminal of said first power supply;
    and a resistive voltage divider connected across said load terminals and a tap on said divider connected to said signal input terminal of said second power supply for applying a predetermined fractional portion of the voltage between said load terminals to said signal input terminal of said second power supply;
    whereby the voltage across said load terminals is programmable to zero and comprises the sum of two voltages fractionally shared in a predetermined ratio by said two power supplies.

2. A master-slave power supply system as set forth in claim 1; wherein said first and second power supplies are of the same output polarity.

3. A master-slave power supply system as set forth in claim 1; wherein said first and second power supplies are of opposite output polarities.

4. A master-slave power supply system as set forth in claim 1; and including an operational amplifier connected across said output terminals for reversing the input polarity to said second power supply.

5. A master-slave power supply system as set forth in claim 1; wherein said programming signal input terminals are inverting input terminals.

6. A master-slave power supply system as set forth in claim 1; wherein said power supplies are unipolar.

7. In a master-slave regulated power supply system, the combination of;
    a first (master) regulated power supply programmable to zero including a programming input terminal;
    a plurality of (slave) regulated power supplies programmable to zero and each including programming signal input terminals;
    two load terminals;
    means for connecting said power supplies in series aiding mode across said load terminals;
    a resistive voltage divider connected across said load terminals and taps on said voltage divider connected to the input terminals of said plurality of power supplies for applying predetermined fractional portions of the voltage between said load terminals to said signal input terminals of said plurality of regulated power supplies;
    and overall degenerative feedback resistor means connected between one of said load terminals and said programming input terminal of said first regulated power supply;
    whereby the voltage between said load terminals is programmable to zero and comprises the sum of the output voltages of said first and plurality of power supplies.

8. A master-slave power supply system as set forth in claim 7; wherein said power supplies are of the same output polarity.

9. A master-slave power supply system as set forth in claim 7; wherein said means for connecting said power supplies in series aiding mode comprises a passive voltage divider.

10. A master-slave power supply system as set forth in claim 7; wherein said power supplies are unipolar.

* * * * *